United States Patent
Ramoji et al.

(10) Patent No.: US 10,805,312 B1
(45) Date of Patent: Oct. 13, 2020

(54) PROGRAMMATICALLY VERIFYING ELECTRONIC DOMAINS

(71) Applicant: Amazon Technologies, Inc., Seattle, WA (US)

(72) Inventors: Sudheer Babu Ramoji, Sammamish, WA (US); Bharath Chinamanthur, Bellevue, WA (US); Ghazal Jaber, Issaquah, WA (US); Karthik Seetharaman, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 261 days.

(21) Appl. No.: 15/928,034

(22) Filed: Mar. 21, 2018

(51) Int. Cl.
*H04L 29/06* (2006.01)
*G06F 16/93* (2019.01)

(52) U.S. Cl.
CPC ............ *H04L 63/123* (2013.01); *G06F 16/93* (2019.01); *H04L 63/083* (2013.01)

(58) Field of Classification Search
CPC ................. H04L 63/083; H04L 63/123; H04L 29/12632; G06F 16/93; G06Q 10/00
See application file for complete search history.

(56) References Cited

U.S. PATENT DOCUMENTS

| 6,640,227 | B1 * | 10/2003 | Andreev | G06K 9/6219 707/737 |
| 9,374,313 | B2 * | 6/2016 | Qiu | H04L 29/12066 |
| 2007/0094500 | A1 * | 4/2007 | Shannon | H04L 63/1441 713/170 |
| 2007/0124400 | A1 * | 5/2007 | Lee | G06F 21/604 709/206 |
| 2007/0294281 | A1 * | 12/2007 | Ward | G06Q 30/02 |
| 2012/0084860 | A1 * | 4/2012 | Cao | H04L 63/1441 726/23 |
| 2014/0380457 | A1 * | 12/2014 | Cassell | H04L 63/1458 726/13 |
| 2018/0262350 | A1 * | 9/2018 | Wei | H04L 9/321 |

* cited by examiner

*Primary Examiner* — Ashokkumar B Patel
*Assistant Examiner* — William B Jones
(74) *Attorney, Agent, or Firm* — Kilpatrick Townsend & Stockton LLP

(57) ABSTRACT

A system for programmatically verifying electronic domain names is provided. For example, the system may receive a plurality of network domain names. A receipt frequency of a subset of the network domain names across a distributed system may be determined and compared with a receipt threshold. When the receipt frequency exceeds a receipt threshold, the network domain name may be matched with additional information that originates from a confirmation source. This information may be provided at a registration network document, which can help expedite a verification process for the user.

19 Claims, 10 Drawing Sheets

P(email domain, enterprise | user, enterprise) =
P(email domain, enterprise) * P(user, enterprise | email domain, enterprise) / P(user, enterprise)

300

Millions of enterprise-only products are just moments away

What email do you want to use?

Ann@acme.com

Check your inbox  ✗

We just sent an email to Ann@acme.com. To continue, click the button in the email to verify your address.

RESEND VERIFICATION EMAIL

Choose a password

Your name

Email (email@account.com)

Password

Re-enter password

By creating an account, you agree to the Conditions of use and Privacy Notice

Next step

Back

For information and assistance, you can contact Enterprise Service, or refer to our conditions of use and privacy policy

*FIG. 4*

Tell us a little about your business so we can verify it. Have multiple locations? Use the address shown on official documents like tax forms.

Enterprise name

| Acme Co. |

Street and number

| 1234 Sample Ln. |

Suite, unit, building, floor (optional)

| |

ZIP Code

| 78564 |

City

| |

State

| Washington ⌄ |

Phone

| 555-345-6789 |

☐ My company is a reseller.

Manage Suppliers

| Search All | Saved Suppliers 1 |

🔍 Search all suppliers by name      [ Search ]

---

Refine by

ⓘ Search for suppliers by name and refinement
Start a new supplier search
- Type a supplier name in the search box above
- Select one or more refinements on the left

Seller Type
☐ Business Seller

Business Location
[ State or Country ]

Avg. Customer Review
★★★★★ & up
★★★★☆ & up
★★★☆☆ & up
★★☆☆☆ & up

Diversity Credentials
☐ Registered Small Business
☐ Women-Owned Business Enterprise
☐ Women-Owned Small Business
☐ Economically Disadvantaged Women-Owned Small Business
☐ Veteran-Owned Small Business
☐ Service Disabled Veteran-Owned Small Business
☐ Minority-Owned Business
☐ SBA-Certified 8(a) Firm
☐ SBA-Certified 8 HUB Zone Firm
☐ SBA-Certified Small Disadvantaged Business
☐ LGBT Business Enterprise

PROGRAMMATICALLY VERIFYING ELECTRONIC DOMAINS

BACKGROUND

Establishing an electronic communication channel with a computer system often requires a registration process prior to accessing additional data. For example, conventional systems may request that a user fill out a form to actively provide data to the system. The form may request a user's name, address, or phone number. The data from the form may be saved as a user profile, in some cases, to communicate with the user after the registration process has completed. However, little is done with this data by the system, other than to communicate with the user. Also, the user is forced to provide the same data multiple times, especially when the user has established communication channels with the computer system previously.

BRIEF DESCRIPTION OF THE DRAWINGS

Various embodiments in accordance with the present disclosure will be described with reference to the drawings, in which:

FIG. 3 is an illustrative user interface for providing an electronic domain name, according to at least some examples;

FIG. 4 is an illustrative user interface for providing a password associated with an electronic domain name, according to at least some examples;

FIG. 6 is an illustrative user interface for providing information via a verified network document and/or gateway, according to at least some examples;

FIG. 7 is an illustrative user interface for providing information via a verified network document and/or gateway, according to at least some examples;

DETAILED DESCRIPTION

Figure 1:
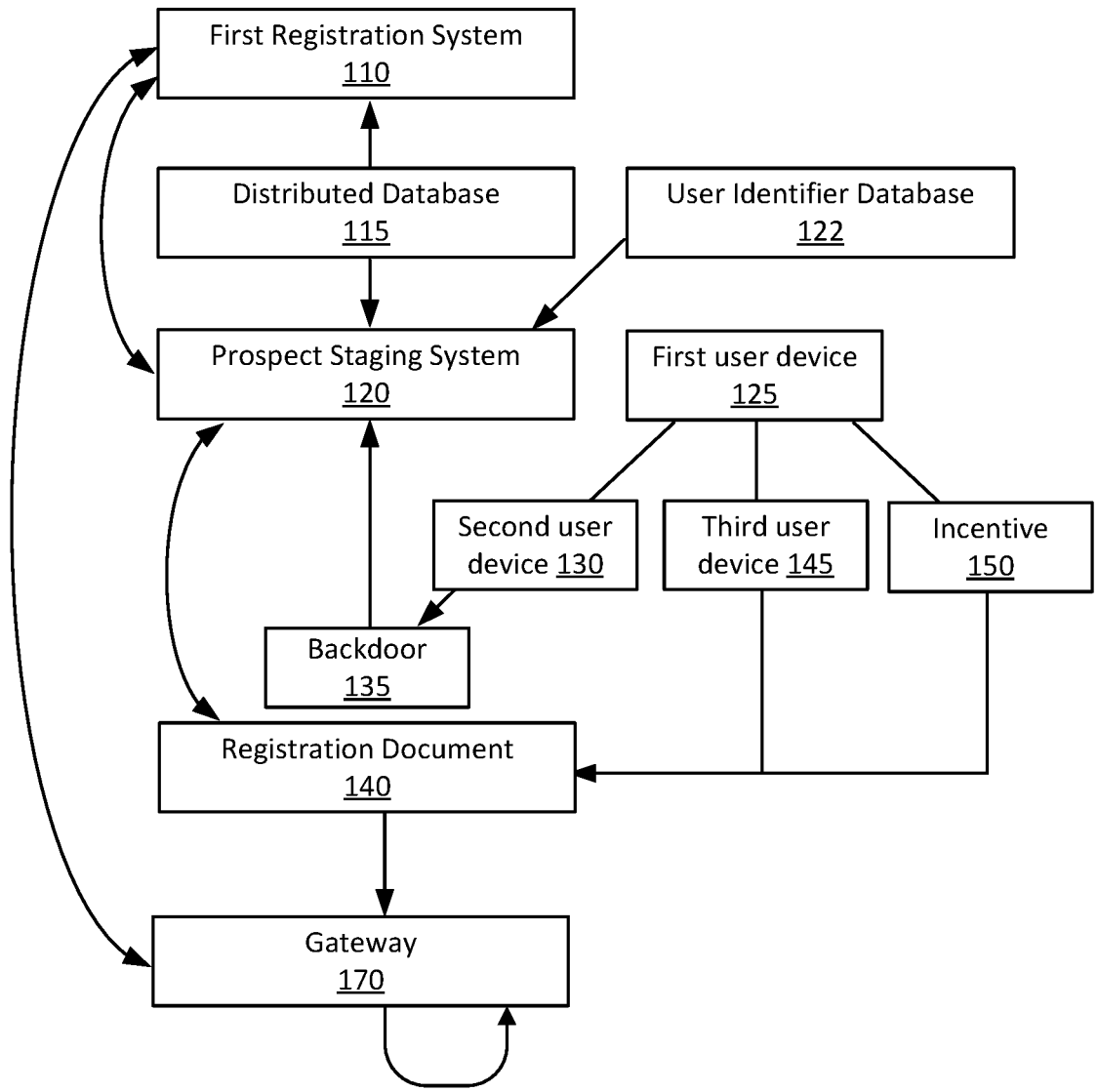
FIG. 1 is an illustrative example of programmatically verifying electronic domains, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for programmatically verifying electronic domains. For example, the system may receive a plurality of network domain names (e.g., "acmeco.com") which may also refer to fully qualified domain names (FQDN, used interchangeably) that comprise at least a user name (e.g., "acmeco," etc.) and a top level domain name (e.g., ".com," ".org," ".net," ".gov," ".biz," ".edu," etc.). The network domain name may be used to form an email address (e.g., "john@acmeco.com"), which in some examples, may be parsed to determine the network domain name. The plurality of network domain names may be received within a distributed system that comprises a plurality of computer systems for various processes. For example, a first computer system may correspond with a service provider (e.g., a web services provider) and a second computer system may correspond with a data aggregator. The network domain names from these various sources may be aggregated to create a list of existing domain names.

The distributed system may analyze the receipt frequency of these network domain names across the distributed system. For example, a network domain name may be provided by a user more often than a predetermined threshold (e.g., "john@freemail.com" or "john@acmeco.com" where "freemail.com" or "acmeco.com" are provided more than the predetermined threshold by a plurality of users in association with providing their email addresses). This may identify the network domain names as corresponding with a free network domain or an enterprise network domain.

In some examples, an enterprise network domain may correspond with any business that implements an email domain associated with its employees, irrespective of a revenue stream for the company. For example, Acme Co. may use john@acmeco.com as an email address for an employee of Acme Co. named "John," which would increase the likelihood that Acme Co. is associated with an enterprise network domain. The network domain name may be dedicated for internal communication of the enterprise. In some examples, the network domain may correspond with an enterprise when the enterprise is able to add or remove email addresses when an employee is hired or leaves the enterprise and/or is associated with a network administrator.

The correlation of the user to an enterprise network domain may identify that a computer corresponding to the enterprise network domain has conducted a separate authentication process and the network domain name associated with the enterprise is less likely to be associated with a fraudulent user. Domain names that have been separately authenticated may be, generally, less likely to be associated with fraudulent users. Additional analysis may be conducted to further confirm that the user is authentic and/or may be associated with an enterprise.

The system may correlate the receipt frequency of this network domain name as a prior probability that the user of the domain name is associated with an enterprise. The distributed system may also compare the network domain name with other confirmation sources to determine various attributes associated with the domain name (e.g., tax number, secure communication protocol for a web address associated with the domain name including https:\\www.acmeco.com, etc.). These attributes from the additional confirmation sources are likely to help identify whether the network domain name is associated with an enterprise.

In some examples, the user may be determined to be associated with the enterprise through a classification process (e.g., a Bayesian classification or the like). The classification process may evaluate the probability that the network domain name is associated with an enterprise using data to determine commonalities between a new potential enterprise and other enterprises that have previously been identified by the system. For example, when previous enterprises are associated with a top level domain ".biz" and a new network domain name comprises the top level domain name ".biz," the classification process may identify a higher likelihood that the new network domain name is also associated with an enterprise.

This information may be received and analyzed prior to requiring the user to register with a third computer system in the distributed system of computers. The analyzed information for determining whether the user is a fraudulent user or not may be provided at a registration network document. This may help prevent the user from providing the same information multiple times to computer systems that have established communication channels between other computer systems in a distributed, connected network of computers. This can also help minimize manual input requirements for the user and can help expedite a verification process for the user, since the computer system is using its previously-verified data.

In an illustrative example, a distributed network system may receive a request to register with a computer system using an email address tied to an enterprise domain, where the request includes a user's email address (e.g., including the user name and top level domain name, etc.). The system may compare a portion of the email address with other portions of email addresses previously received by the system and determine whether the portion of the email address matches other portions of email addresses. This comparison may help determine a network domain name associated with the email address has been received previously with other systems and, in some examples, determine the likelihood that the user is attempting to register with the system on behalf of an enterprise. The system may remove any correlations to free email addresses and keep any correlations to enterprises based on various statistical analyses and assumptions. The system may also match the portion of the email address with additional information that can help the user register with the system. To further help with registering an account associated with the email address, the system may pre-populate that additional information so that this information does not need to be manually entered (e.g., in a registration form, etc.).

Technical improvements over conventional systems are realized throughout the disclosure. For example, the improved computer system may utilize existing data for a different purpose and generate inferences from the aggregated data from multiple sources. The inferences may include that a particular network domain name is subject to higher security restrictions than other network domain names, which can improve the data security in the improved computer system without implementing redundant, additional processing and increase the efficiency of other processing that is still conducted with the improved computer system. This may comprise a first level of data verification (e.g., relying on a probability of increase data security from a data source, etc.). Additionally, the improved computer system may match the network domain name with other data sources to gather additional data corresponding with the network domain name. This may further assist the improved computer system in determining the likelihood of improved data security from the source of the network domain name. The improved computer system may implement the multi-leveled authentication and verification to increase data security within its own computer system. For example, when a particular network domain name is associated with a higher level of verification (e.g., associated with an enterprise instead of a free network domain name, etc.), the improved computer system may permit access to a verified network document and/or gateway. The access to the verified network document and/or gateway may be otherwise restricted when the network domain name does not pass the verification processes or based on one or more determinations discussed herein.

FIG. 1 is an illustrative example of programmatically verifying electronic domains, according to at least one example. An illustration of a distributed system 100 is provided. For example, the distributed system 100 may include a plurality of computer systems at different locations, or computer systems that are virtually implemented to conduct specialized operations to advance the programmatic verification process. In some examples, the distributed system 100 may include various computer systems associated with different entities, each that provide different data associated with network domain names. The different computer systems, in this example, may be electronically separated by at least one electronic firewall to prevent unauthorized users from gaining access to the individual computer systems.

Other implementations of electronic separation, other than electronic firewalls or physically separated computer systems, are available as well. For example, one of the computer systems may verify and communicate with the other computer system by first binding an internet protocol (IP) address with the other computer system through a user identification management integration, so that communications between the computer system may be expedited. The communications may be expedited when the first computer system provides data from the known IP address, so that a separate verification process within the distributed system 100 is not necessary with each communication instance. These physical separations and inability to easily share data between the computer systems may add to the technical hurdles that are overcome by the improved system described in this disclosure.

Returning to illustration 100, the distributed system 100 may include a first registration system 110. The first registration system 110 may receive one or more network domain names for verification through a transaction management system. The first registration system 110 may implement fraud detection, manual verifications, or other processes for verifying an enterprise network domain name. This verification process may comprise a first of many verifications implemented in the distributed system 100.

The first registration system 110 may receive input for verification. The input, in some examples, may be limited to enterprise information. The input may include, for example, an enterprise name, enterprise address, network domain name, or other information (e.g., contact name, contact email address, etc.).

The input for verification may be compared with other sources of data, including the one or more domain name registrars, the data aggregation computer system, or the letterhead. Upon determining that the provided network domain name matches any network domain name provided with the contact information stored with any of these data sources, the first registration system 110 may determine that it is more likely that the network domain name is associated with an enterprise.

For example, the first registration system 110 may electronically communicate with one or more domain name registrars. The first registration system 110 may provide the network domain name from the input to a first domain name registrar. The domain name registrar network document associated with the first domain name registrar may match the input from the first registration system 110 with information in a data store associated with the first domain name registrar and provide additional information in response to the provided information from the first registration system 110, including contact information associated with the provided network domain name. The first registration system 110 may confirm that the provided network domain name matches any network domain name provided with the contact information stored with the first domain name registrar. This confirmation process may be repeated for more than one domain name registrar, including a second domain name registrar that may match and provide second contact information associated with the provided network domain name.

In some examples, the first registration system 110 may electronically communicate with a data aggregation computer system to determine contact information for one or more employees with the enterprise. For example, the data aggregation computer system may identify an executive with the enterprise and any contact information corresponding with the executive. The first registration system 110 may confirm that the provided network domain name for the employee matches any network domain name provided with the contact information stored with the data aggregation computer system.

In some examples, the first registration system 110 may determine a letterhead of the enterprise, which may also include contact information or a network domain name for the enterprise. For example, the letterhead may include an enterprise name, phone number, and network domain name associated with the enterprise that provides additional information about the enterprise via a network document. The first registration system 110 may confirm that the information associated with the letterhead matches any network domain name provided with the first registration system 110.

Other verification methods are available as well. In some examples, the verification process by the first registration system 110 may transmit a notification to a user asking the user to log into an account associated with a network domain name (e.g., john@acmeco.com). The notification may comprise a code (e.g., an alphanumeric code including "ABC123," etc.). The user may be asked to log into the separate account associated with the network domain name to retrieve the code and transmit it back to the first registration system 110 implementing the verification process. When the code that was transmitted to the user is received from the user, the verification process may identify that the user has access to the network domain name (e.g., "Please log into your email account for john@acmeco.com and retrieve the code we just sent you. When you send us the code, this will help verify your account.").

The first registration system 110 may analyze the network domain names for functionality features. This may help verify that these network domain names are operational network domain names and not fraudulent. The network domain names that are provided for this first registration system 110 may be analyzed to future analysis of the network domain names to include only valid domain names that are configured to be verified through other processes.

The distributed system may comprise a distributed database 115. The distributed database 115 may receive network domain names that have been verified through the first registration system 110, including a manual verification process, that may be triggered when a new network domain name is received (e.g., as part of an email address, etc.). The manual verification process may include communicating with an electronic domain and determining whether the communications were received. The output of the distributed database 115 may produce one or more electronic domain names that are configured to be further verified after processing through the first registration system 110.

The distributed database 115 may include a data store of network domain names. The key in the data store may correspond with a network domain name. For example, a first table of the distributed database 115 may comprise a single, unique instance of each network domain name received by the distributed system 100. As a sample illustration of the first table, this first table may include one data entry for acmeco.com, one data entry for betabrand.com, and one data entry for freeemail.com. A second table of the distributed database 115 may comprise each email address received by the distributed system 100 and the corresponding network domain name for that email address. As a sample illustration of the second table, the second table may include one data entry for john@acmeco.com, one data entry for jane@acmeco.com, and so on.

The distributed database 115 may receive a plurality of network domain names and identify top level domain names associated with each network domain name. In some examples, subdomain names may be removed so that only the top level domain names are analyzed. The plurality of network domain names may comprise at least a user name and the top level domain name. The plurality of network domain names may be filtered and aggregated to generate a subset of network domain names that are unique.

The distributed database 115 may be used by the prospect staging system 120 to verify the network domains stored with the distributed database 115. For example, the prospect staging system 120 may access the distributed database 115 to determine a receipt frequency of the network domain names. The receipt frequency may correspond with a number of times that each of the network domain name has been received by any computer system across the distributed system 100. For example, a network domain name may be provided by a user more often than a predetermined threshold (e.g., "john@freemail.com" or "john@acmeco.com" where "freemail.com" or "acmeco.com" are provided more than the predetermined threshold by a plurality of users in association with providing their email addresses). The user may provide the network domain name with a registration process to access restricted network data provided by the distributed system 100. The user may, in some examples, register for access to this restricted data by providing an email address, a user name, or other identifier, which, in some examples, may correspond with the electronic domain name configured to be verified. The plurality of registrations of various network domain names may be aggregated to a common data store within the distributed system 100 and used to identify the receipt frequency of the particular network domain name.

The distributed database 115 may be used by the prospect staging system 120 to filter the plurality of network domain names corresponding with multiple instances of the same user identifier during a de-noising process. The user identifiers and other profile information may be stored with a user identifier database 122. This may remove multiple accounts with the same user name or that correspond with similar users. For example, the filtering processing may remove one of two email network domain names corresponding with a single user (e.g., when the single user accesses different computers in the distributed system 100).

The distributed database 115 may be used by the prospect staging system 120 to remove network domain names from a predetermined list of network domain names as part of the verification process. The removal process may identify and delete blocked network domain names (e.g., "fraudster.org") or free email network domain names (e.g., "freemail.com," etc.). The determination of a network domain name corresponding with an enterprise may be a prior probability to a statistical inference of an uncertain quantity that the probability distribution would correspond with a valid enterprise account. For example, a blocked network domain name may correspond with a random event or an uncertain proposition that is assigned before any relevant data associated with the particular user is received. In another example, a free email network domain name corresponding with a user email address may also correspond with a prior probability distribution that the user may not be associated with a valid enterprise. In either of these cases, the user may correspond with a valid enterprise and additional statistical inferences and data may be received to refute the prior probability that the user is associated with an invalid enterprise.

In the example where the user is not associated with a valid enterprise, the probability that the user is classified with a verified network domain name may be reduced, so that the user is less likely to be provided access to a verified network document or gateway associated with the distributed system 100. The access to these or other devices may be restricted, which may help increase data security to these systems. The user may, in some examples, continue to access other systems within the distributed system 100 without confirming an association to a valid enterprise.

The distributed system 100 may be used by the prospect staging system 120 to receive a plurality of network domain names from a massive set of network domain names. The network domain names may comprise at least a user name and a top level domain name that have registered for a different purpose than verification and access to a verified network document or gateway. As a sample illustration, the massive set of network domain names may comprise 220 million users that correspond with almost 90 million network domain names and 225,000 enterprise network domain names.

The distributed database 115 may be used by the prospect staging system 120 to implement a classification process (e.g., Bayesian classification, etc.) of what is the probability as a given network domain name belonging to an enterprise given a particular posterior data and a prior associated with the identification of the network domain name as corresponding with a predetermined enterprise. In some examples, this may comprise self-clustering. The self-clustering may group the received network domain names and corresponding user identifiers with other similar network domain names along a distribution.

The distributed database 115 may be used by the prospect staging system 120 to implement a verification process with a confirmation source and, at least in part, receive additional information from the confirmation source. The additional information may originate from the confirmation source or other data source associated with the distributed database 115 or distributed system 100. In some examples, the additional information may correspond with a unique identifier that identifies a particular enterprise (e.g., tax number, etc.).

As a sample illustration, the verification process may receive a second set of network domain names from the confirmation source and compare the received second set of network domain names with the verified network domain names from distributed database 115. The confirmation source may separately verify the second set of network domain names. When the received second set of network domain names is compared with the verified network domain names from distributed database 115, matching network domain names may be identified, including network domain names that correspond with an enterprise.

In some examples, the verification process may generate Venn diagram of overlapping network domain names from the distributed database 115 and the confirmation source. The overlapping network domain names may comprise a plurality of enterprise network domain names that are verified from each source.

The additional information may comprise data that can help determine whether the network domain name is associated with an enterprise. This may include, for example, a network domain name associated with a secure communication protocol that adds a layer of security on the data through one or more network connections. As a sample illustration, when pinging the network domain name to receive additional information about the network domain name, the accessed network document associated with the network domain name may correspond with a public domain certificate or Hypertext Transfer Protocol Secure (HTTPS) network address rather than a standard web transfer protocol (HTTP) network address. The use of the more secure protocol may add a layer of security on the data in transit through a secure socket layer (SSL) or other communication protocol.

The additional information may be used to generate a confidence code. The confidence code may correspond with the likelihood that a particular network domain name from the second set of network domain names from the confirmation source matches the verified network domain names from distributed database 115. The confidence code may be associated with a range of values to identify that the two sources are the same, similar, different, or missing (e.g., unable to be matched because one source is unavailable).

The matching process may comprise a variety of string search algorithms that are used in part to generate the confidence code corresponding with the likelihood that the two network domain names match. The string search algorithms may correspond with an exact matching or approximate matching.

In some examples, second additional information may be received. For example, the confidence code associated with a match between a first network domain name and the second network domain name may be inconclusive to determine that the two network domain names are the same. Second additional information may be requested and received from the confirmation source. For example, the second additional information may comprise an enterprise email, enterprise name, enterprise address, number of employees at the enterprise, or other information associated with the enterprise.

In some examples, the additional information may be matched with the electronic domain name that is configured to be verified when the receipt frequency of the electronic domain name exceeds a receipt threshold. Additional information associated with the receipt threshold is provided with FIG. 2.

Figure 2:
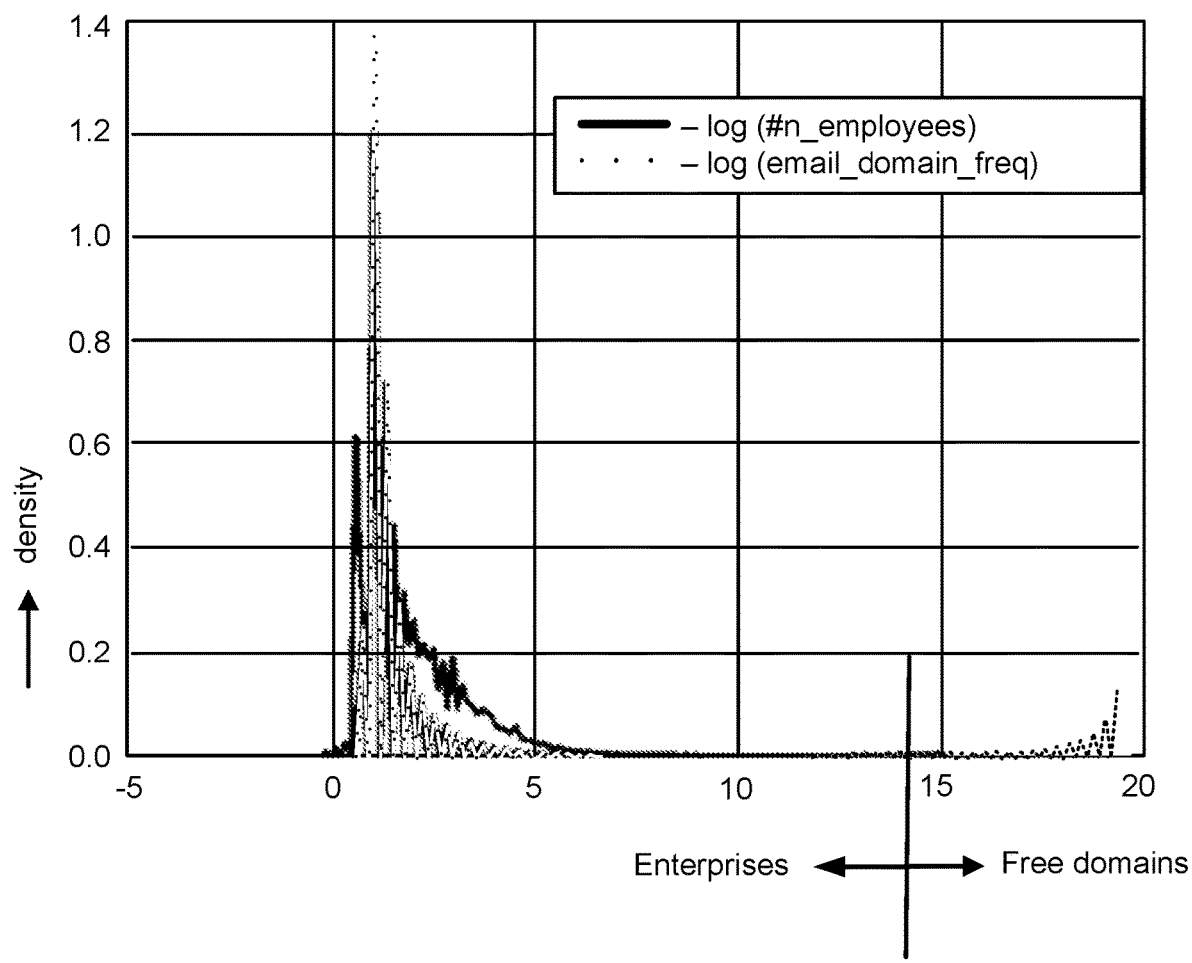
FIG. 2 illustrates a chart showing a distribution of a receipt frequency for a plurality of electronic domain names configured to be verified, according to at least one example.

FIG. 2 illustrates a chart showing a distribution of a receipt frequency for a plurality of electronic domain names configured to be verified, according to at least one example. In illustration 200, the receipt frequency associated with an electronic domain name is identified along a chart. The density of receiving the particular electronic domain names correlate with a density associated with the receipt frequency. When the receipt frequency is less than a threshold (e.g., five, fifteen, etc.), the prior probability may correspond with a higher likelihood that the network domain name, including the user name and top level domain name associated with the network domain name and provided by the user during the registration process, is associated with a small to medium enterprise. When the receipt frequency exceeds a receipt threshold, the prior probability may correspond with a higher likelihood that the network domain name provided a user during the registration process is associated with a free domain or a large enterprise.

In some examples, the domain name distribution may be identified at the receipt threshold between all enterprise domain names and free domain names. In other examples, the domain name distribution may be separated at the receipt threshold between small or medium enterprise domain names and free domains or large enterprise domain names. Additional analysis integration may be required by the distributed system 100 to further differentiate between the free domain names and at least a subset of enterprises (e.g., enterprises with a number of employees above the receipt threshold, etc.).

In some examples, the network domain names may be filtered to remove domain names that correspond with individuals, which may be restricted from accessing the verified network document or gateway 170. The receipt frequency of these network domain names may be less than the receipt threshold, which may erroneously correspond with enterprise data. These individual domain names may be removed as false positives. The removal of the individual domain names may be implemented using a variety of processes, including an identification propensity model to compute probability scores for a given user to be associated with an enterprise.

The determination of the probability scores for a given user to be an enterprise user may correspond with one or more equations, including P(email domain, enterprise|user, enterprise)=P(email domain, enterprise)*P(user, enterprise|email domain, trusted)/P(user, enterprise), where P(email domain, enterprise) can be learned to using a nonparametric density estimator. The nonparametric density estimator may comprise a kernel density estimator with a linear kernel function. This may also correspond with an enterprise network domain name prior model. The P(user, enterprise) may correspond with a normalization constant. The P(user, enterprise|email domain, trusted) may be computed from the joint distribution of P(user, enterprise) and P(email domain, enterprise), which may correspond with the enterprise domain name evidence model. The P(user, enterprise) may be provided by a corresponding propensity model and/or existing user identified in the distributed system 100.

In some examples, the distributed database 115 may limit the number of data records by only storing unique entries in the first table or the second table of the distributed database 115 without diverting from the scope of the disclosure. The data limitation may help minimize duplicate entries in the distributed system 100 and further increase data efficiency of the system overall (e.g., deduplication of data, etc.).

Returning to FIG. 1 and upon a first verification of the network domain names, the prospect staging system 120 may provide one or more network documents that are accessible to users associated with the electronic domain name configured to be verified. In some examples, existing users of the distributed system 100 may be stored with a user identifier database 122 and may also be accessed by the prospect staging system 120 to access the one or more network documents. In some examples, the users identified with the user identifier database 122 may access network documents that are less restricted than the network documents associated with the gateway 170. In some examples, the prospect staging system 120 may be accessible to these users after the initial verification process has completed.

The prospect staging system 120 may be accessible via a variety of interactions associated with user devices or notifications. For example, a first user device 125 may be associated with engagement of the user through a plurality of communication channels, including through a second user device 130, a third user device 145, or an incentive 150. The communication channels may include, for example, email (e.g., sending a direct email to an email address that is not currently accessing the gateway 170, etc.) or identifying a user login to a second computer system of the distributed system 100 and providing a notification (e.g., user logs into http://www.merchant.com and a pop-up notification is provided that introduces the existence of gateway 170 that is accessible with a verified enterprise domain name, etc.). The engagement of the user may correspond with a particular user that is not currently registered with the distributed system 100 and is associated via the network domain name that has been verified through the verification process.

In some examples, the first user device 125 may compare the network domain name with a blacklist. A network domain name may be listed on the blacklist and prevented from accessing the registration network document 140 or gateway 170. The blacklist, in some examples, maybe generated by an employee at the enterprise or other administrator associated with a deterioration process.

The second user device 130 may correspond with a sales manager that is directly associated with one or more large enterprises. The second user device 130 may correspond directly with an employee at the enterprise and provide input for forms for registration so that the employee associated with the enterprise would not need to provide input for forms. The second user device 130 may correspond with the user associated with the network domain name through a user device and a communication network.

When the user device associated with the network domain name corresponds with the second user device 130, the user device may be routed and/or access a backdoor document 135 to a registration network document 140. This access to the backdoor document 135 may prevent one or more network pages from being displayed to the user device based at least in part on the verified electronic domain name after a first verification process has completed. For example, the network domain name may correspond with a confidence score that is higher than a threshold and/or a receipt frequency that exceeds the receipt threshold. These additional verification measures may reduce the number of network documents provided to the user while interacting with the prospect staging system 120.

In some examples, the backdoor document 135 may be accessible by providing a user name associated with the verified electronic domain name to a user interface, as illustrated with FIGS. 3 and 4. As shown in illustration 300 of FIG. 3, the user may provide the previously verified information via the user interface, including an email address that includes a network domain name. The email address may be transmitted to the distributed system 100 to confirm that the network domain name exists as a verified network domain name during the verification process.

Once authenticated, one or more backdoor documents may be provided via a second user interface as illustrated in FIG. 4. In illustration 400 of FIG. 4, the user may provide new information via the user interface, including a password, to be stored with a user profile associated with the user and stored with a user identifier database 122. This information stored with the user profile may be used for access to the account. The user profile may also comprise the additional information received from the confirmation source and/or distributed database 115 described throughout FIG. 1.

Returning to the engagement interactions with the user in FIG. 1, the third user device 145 may correspond with a user associate that interacts with multiple, smaller enterprises. These enterprises may also exceed the receipt threshold for the corresponding receipt frequency. In some examples, these enterprises may be smaller and may not be verified as often as the larger enterprises that are interacting with the second user device 130. In some examples, the probability may be lower that these smaller enterprises maintain data security as robust as the larger enterprises, which may allow a different level of access to verified network documents and/or the gateway in the distributed system 100.

An additional option for an engagement interaction with the user is associated with an incentive 150. The incentive 150 may be transmitted to the email address corresponding with the network domain name to initiate an interaction with the registration document by the user.

The user may access the registration network document 140, either through the backdoor document 135 or directly through the registration network document 140. The distributed system 100 may receive a first indication of access to the registration network document by the user, for example, when the user provides the user name and top level domain name corresponding with the electronic domain name configured to be verified to the registration network document 140.

The various engagements between the prospect staging system 120 and the user may direct the user to a registration network document 140. The registration network document 140 may be populated with information associated with the user name, additional information, second additional information, or other information that may help the user complete the registration network document 140. A sample registration document is provided with FIG. 5.

Figure 5:
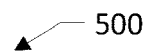
FIG. 5 is an illustrative user interface for receiving additional information, according to at least some examples.

FIG. 5 is an illustrative user interface for providing additional information, according to at least some examples. In illustration 500, the user interface displays user attributes that may be associated with a user profile. When the information has been previously received, the information may be provided with the user interface, so that the user would not need to provide the information again. The information previously received may have been analyzed and matched with the data generated from the verification process. When the information has not been previously received or has not been verified, the user may provide new information associated with the enterprise via the registration document in illustration 500, including name, address, phone number, and the like.

In some examples, the electronic domain name configured to be verified may be stored in a temporary data store and received by different systems or devices throughout the verification and authentication process. The temporary data store may comprise a cache (e.g., corresponding with temporary Internet files of the user's browser, etc.) or a temporary data store associated with one or more devices in the distributed system 100.

In some examples, the electronic domain name that is configured to be verified and that is associated with the user may be authenticated prior to permitting access to the registration network document 140.

The authentication process may be passive or active. For example, a passive authentication process may comprise receiving the electronic domain name from the verification process and confirming the electronic domain name (e.g., which is stored in the temporary data store and passed to the registration network document 140). The active authentication process may comprise receiving the electronic domain name from the user, irrespective of the verification process. In some examples, this authentication process may confirm that the user is associated with a trusted domain identified by the distributed database 115 and/or confirmation sources. In some examples, this may comprise transmitting a notification to an account associated with the electronic domain name and requesting a confirmation that the user has access to the account.

Returning to the distributed system 100 of FIG. 1, a confirmation message may be transmitted. For example, once any new registration information has been received from the user, the distributed system 100 may transmit a confirmation message to the electronic domain name associated with the user. The user may receive the confirmation message and respond by transmitting a confirmation to the notification back to the distributed system 100. This may comprise selecting a link in the confirmation message that will transmit an electronic communication back to the distributed system 100 using a standard communication protocol.

The distributed system 100 may receive the confirmation of the notification in response to the transmission of the notification to the account associated with the electronic domain name. This may comprise an additional verification step of the process, which at least in part helps to confirm that the user has access to the electronic domain name that the user provided earlier in the process.

The distributed system 100 may comprise a gateway 170. The gateway 170 may provide a verified network document that provides items that are customized for the enterprise associated with the electronic domain name and/or user name that has been verified. The items may comprise restricted items (e.g., medical devices or products, etc.) that are limited in accessibility to users associated with verified electronic domain names and enterprises. In some examples, the gateway 170 may enable display of notifications or additional information associated with attributes of the electronic domain name. Illustrative user interfaces associated with the gateway 170 are provided with FIGS. 6-7.

In illustration 600 of FIG. 6, the gateway 170 may provide access to additional information that may not be accessible in a standard user interface of the distributed system 100. For example, user interface may provide search options to find other users and filter the search options by user reviews, diversity credentials, type of user, or location. The user may select one or more of these options to filter access to other users through the distributed system 100.

Figure 7:
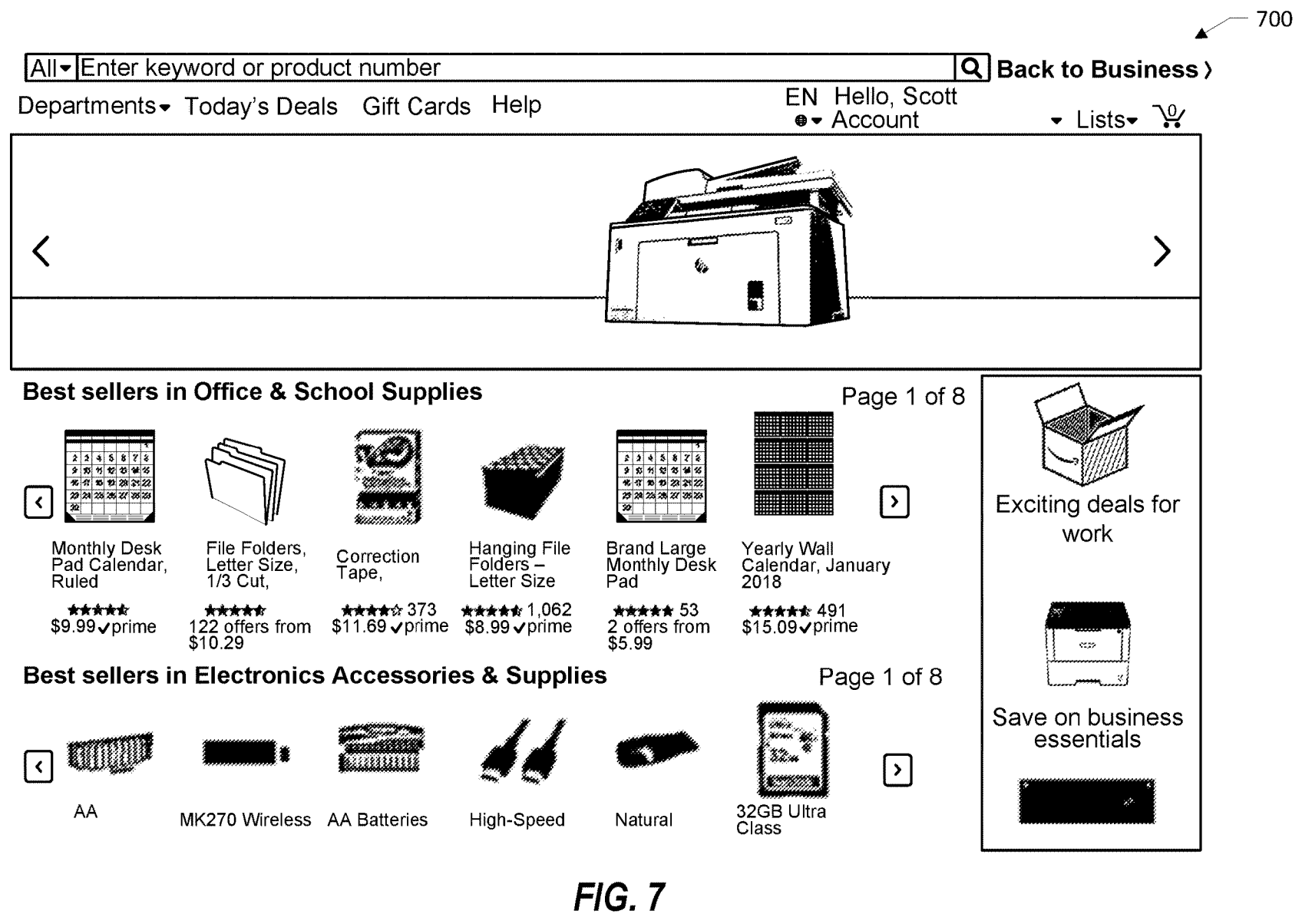

In illustration 700 of FIG. 7, the gateway 170 may provide access to items that may not be accessible in a standard user interface of the distributed system 100. In some examples, the items may be filtered to correspond with an attribute of the user. As a sample illustration, the user may correspond with a first attribute (e.g., enterprise="office") and items may be filtered and provided to the user that also correspond with the first attribute (e.g., item A="office). As illustrated, the items may comprise office supplies, including a calendar, file folders, batteries, and the like.

In some examples, the electronic domain names that have been verified and have enabled access to the registration network document 140 and the gateway 170 may be transmitted to the first registration system 110 for a future verification processes. The electronic domain names may be parsed to identify the network domain name and any new network domain names that are not currently stored with the first registration system 110 may be appended to the existing list of network domain names.

Figure 8:
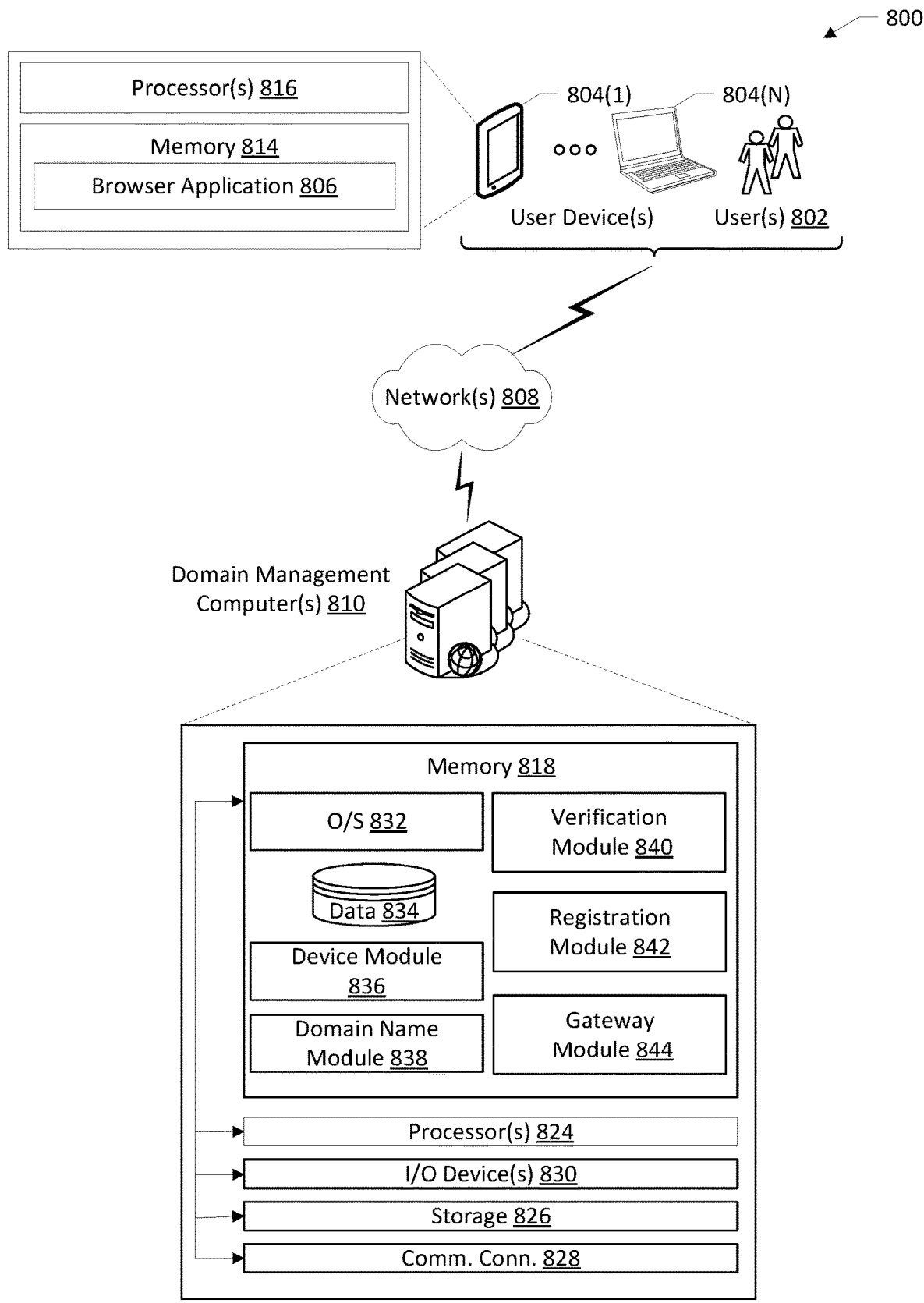
FIG. 8 illustrates an example architecture for programmatically verifying electronic domain names described herein that includes a domain management computer and/or a user device connected via one or more networks, according to at least one example.

FIG. 8 illustrates an example architecture for programmatically verifying electronic domain names described herein that includes a domain management computer and/or a user device connected via one or more networks, according to at least one example. In architecture 800, one or more users 802 (i.e., web browser users) may utilize user computing devices 804(1)-(N) (collectively, user devices 804) to access an application 806 (e.g., a web browser), via one or more networks 808. In some aspects, the application 806 may be hosted, managed, and/or provided by a computing resources service or service provider, such as by utilizing one or more service provider computers and/or one or more domain management computers 810. The one or more domain management computers 810 may, in some examples, provide computing resources such as, but not limited to, client entities, low latency data storage, durable data storage, data access, management, virtualization, cloud-based software solutions, electronic content performance management, etc. The one or more domain management computers 810 may also be operable to provide web hosting, computer application development, and/or implementation platforms, combinations of the foregoing, or the like to the one or more users 802. The one or more domain management computers 810, in some examples, may help verify the electronic domain names.

In some examples, the networks 808 may include any one or a combination of many different types of networks, such as cable networks, the Internet, wireless networks, cellular networks and other private and/or public networks. While the illustrated example represents the users 802 accessing the application 806 over the networks 808, the described techniques may equally apply in instances where the users 802 interact with the domain management computers 810 via the one or more user devices 804 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 806 may allow the users 802 to interact with a service provider computer, such as to access web content (e.g., web pages, music, video, etc.). The one or more domain management computers 810, perhaps arranged in a cluster of servers or as a server farm, may host the application 806 and/or cloud-based software services. Other server architectures may also be used to host the application 806. The application 806 may be capable of handling requests from many users 802 and serving, in response, various item web pages. The application 806 can provide any type of website that supports user interaction, including social networking sites, online retailers, informational sites, blog sites, search engine sites, news and entertainment sites, and so forth. As discussed above, the described techniques can similarly be implemented outside of the application 806, such as with other applications running on the user devices 804.

The user devices 804 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 804 may be in communication with the domain management computers 810 via the networks 808, or via other network connections. Additionally, the user devices 804 may be part of the distributed system managed by, controlled by, or otherwise part of the domain management computers 810 (e.g., a console device integrated with the domain management computers 810).

In one illustrative configuration, the user devices 804 may include at least one memory 814 and one or more processing units (or processor(s)) 816. The processor(s) 816 may be implemented as appropriate in hardware, computer-executable instructions, firmware, or combinations thereof. Computer-executable instruction or firmware implementations of the processor(s) 816 may include computer-executable or machine-executable instructions written in any suitable programming language to perform the various functions described. The user devices 804 may also include geo-location devices (e.g., a global positioning system (GPS) device or the like) for providing and/or recording geographic location information associated with the user devices 804.

The memory 814 may store program instructions that are loadable and executable on the processor(s) 816, as well as data generated during the execution of these programs. Depending on the configuration and type of user device 804, the memory 814 may be volatile (such as random access memory (RAM)) and/or non-volatile (such as read-only memory (ROM), flash memory, etc.). The user device 804 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 814 may include multiple different types of memory, such as static random access memory (SRAM), dynamic random access memory (DRAM), or ROM.

Turning to the contents of the memory 814 in more detail, the memory 814 may include an operating system and one or more application programs or services for implementing the features disclosed herein, such as via the browser application 806 or dedicated applications (e.g., smart phone applications, tablet applications, etc.). The browser application 806 may be configured to receive, store, and/or display a website or other interface for interacting with the domain management computers 810. Additionally, the memory 814 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 802 provided response to a security question or a geographic location obtained by the user device 804.

In some aspects, the domain management computers 810 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the domain management computers 810 may be in communication with the user devices 804 and/or other service providers via the networks 808, or via other network connections. The domain management computers 810 may include one or more servers, perhaps arranged in a cluster, as a server farm, or as individual servers not associated with one another. These servers may be configured to implement the content performance management described herein as part of an integrated, distributed computing environment.

In one illustrative configuration, the domain management computers 810 may include at least one memory 818 and one or more processing units (or processor(s)) 824. The processor(s) 824 may be implemented as appropriate in hardware, computer-executable instructions, firmware, or combinations thereof. Computer-executable instruction or firmware implementations of the processor(s) 824 may include computer-executable or machine-executable instructions written in any suitable programming language to perform the various functions described.

The memory 818 may store program instructions that are loadable and executable on the processor(s) 824, as well as data generated during the execution of these programs. Depending on the configuration and type of domain management computers 810, the memory 818 may be volatile (such as RAM) and/or non-volatile (such as ROM, flash memory, etc.). The domain management computers 810 or servers may also include additional storage 826, which may include removable storage and/or non-removable storage. The additional storage 826 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 818 may include multiple different types of memory, such as SRAM, DRAM, or ROM.

The memory 818, the additional storage 826, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 818 and the additional storage 826 are all examples of computer storage media. Additional types of computer storage media that may be present in the domain management computers 810 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the domain management computers 810. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The domain management computers 810 may also contain communications connection(s) 828 that allow the domain management computers 810 to communicate with a stored database, another computing device or server, user terminals and/or other devices on the networks 808. The domain management computers 810 may also include I/O device(s) 830, such as a keyboard, a mouse, a pen, a voice input device, a touch input device, a display, speakers, a printer, etc.

Turning to the contents of the memory 818 in more detail, the memory 818 may include an operating system 832, one or more data stores 834, and/or one or more application programs or services for implementing the features disclosed herein including a device module 836, a domain name module 838, a verification module 840, a registration module 842, and/or a gateway module 844. The modules may be software modules, hardware modules, or a combination thereof. If the modules are software modules, the modules will be embodied on a computer readable medium and processed by a processor in any of computer systems described herein.

The device module 836 may be configured to receive a user name or electronic domain name associated with the user. The device module 836 may also receive a user identifier associated with the user to provide additional information associated with a verification or authentication process.

The domain name module 838 may be configured to parse an electronic domain name into a username and a top level domain name. For example, the domain name module 838 may identify a user name as comprising text or numbers prior to an "@" (at symbol) for an electronic domain name associated with an email address. The domain name module 838 may also identify a network domain name and top level domain name comprising text or numbers after an "@" (at symbol) for electronic domain name. The network domain name and top level domain name may be associated with an email address. The parsing of the network domain name may include identifying any subdomain names. This may comprise subdomains that are separated by symbols after the "@" (at symbol).

The identification of the network domain name, top level domain name, and any sub level domain names may be identified by a separation of symbols in the electronic domain name (e.g., separated by "." or "-," etc.). The identification of the network domain name, top level domain name, and any sub level domain names may also comprise a comparison of the electronic domain name with other electronic domain names that have been received by the distributed system (e.g., compare "@acmeco.com" with other parsed email addresses received by the system, etc.).

As a sample illustration, the email address "john@electronics.acmeco.com" may be parsed to subcomponents "john" "@" "electronics" "." "acmeco" "." and "com." The parser of the domain name module 838 may identify the first substring "john" as corresponding with the user name of a network domain name. The email address may also be associated with the substrings after the "@" symbol, including "electronics" (e.g., subdomain name), "acmeco" (e.g., user name), and "com" (e.g., top level domain name). In some examples, the "." may correspond with a substring separator rather than a substring for parsing, so the "." may be removed from consideration as a substring.

Each of the remaining substrings may be compared with a receipt frequency of all domain names received by the system. The domain names within a first receipt frequency range may be identified as network domain names and domain names within a second receipt frequency range may be identified as sub level domain names. The sublevel domain names may be received at a lower frequency in the network domain names. In some examples, the last two sub strings (e.g., "acmeco" and "com") may be assumed to be the network domain name (e.g., by comparing these substrings with a list of existing network domain names, instead of comparing the receipt frequency of the substrings with other substrings received by the system, etc.).

The verification module 840 may be configured to receive network domain names that have been verified through the first registration system, including a manual verification process that may be triggered when a new domain name is received. The verification module 840 may be configured to filter and aggregate the network domain names to create a plurality of network domain names that are unique. The verification module 840 may be configured to compare new domain names with existing domain names that have been registered with computer systems in a distributed system of computers. The verification module 840 may be configured to determine a receipt frequency that corresponds with a number of times a network domain name has been received through various registration processes. This may correspond with the classification process of determining whether a given domain name is associated with an enterprise given particular prior or posterior evidence. The verification module 840 may be configured to remove network domain names as well (e.g., blocked or fraudulent network domain names, free network domain names, etc.).

The registration module 842 may be configured to receive additional data and compare the additional data to existing data associated with the domain management computer 810 that can determine whether the network domain name is associated with an enterprise. Some of the data, including either the additional data from the confirmation source or the existing data from the domain management computer 810, may correspond with identifying the communication protocol associated with the domain name (e.g., secure or standard, etc.), confidence code, tax number, enterprise name, address, number of employees, or other data discussed herein.

The gateway module 844 may be configured to allow access to a verified network document. In some examples, the gateway module 844 may be configured to compare the electronic domain name associated with the user name to a list of authenticated electronic domain names prior to allowing access to the verified network document.

Figure 9:
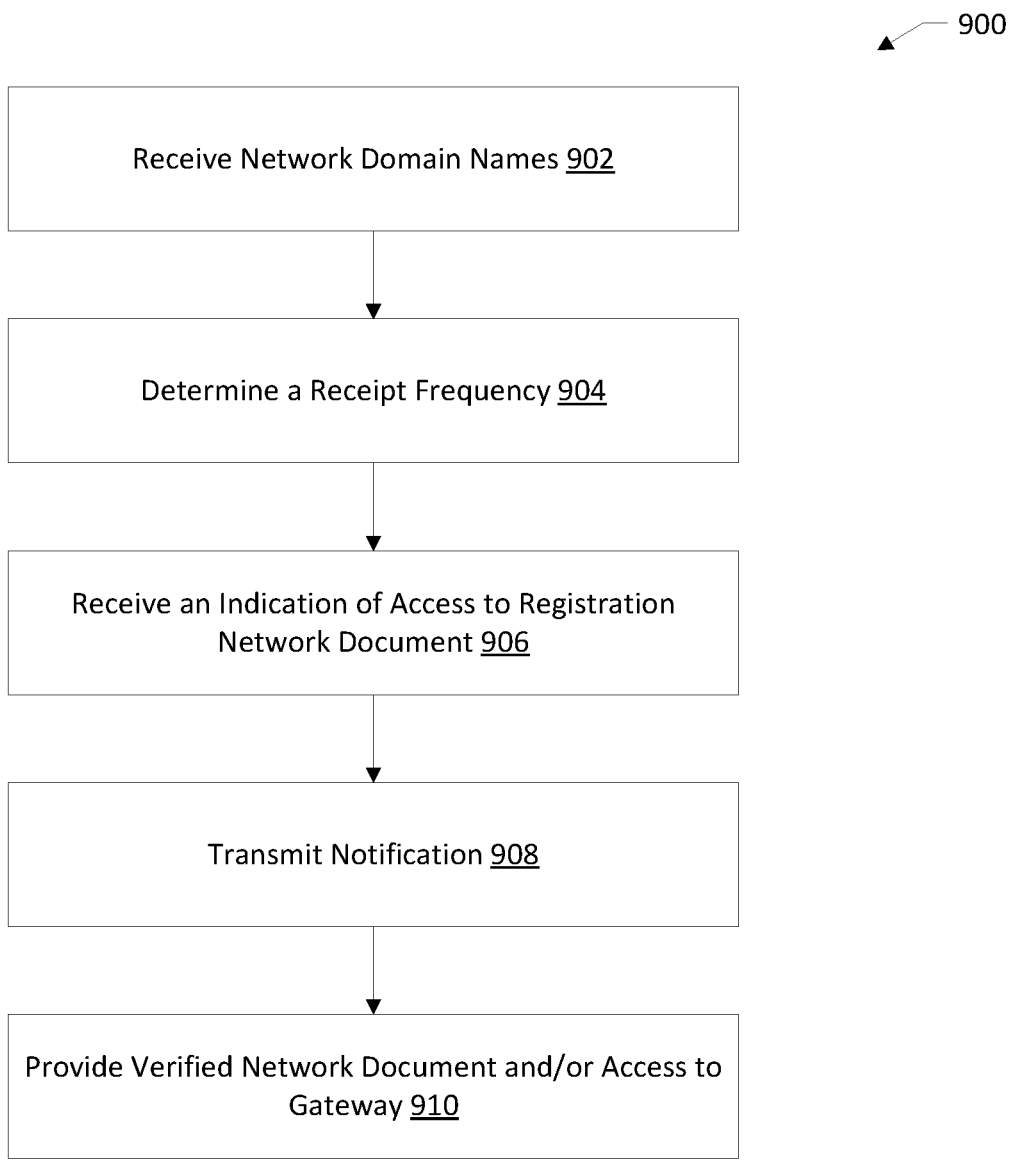
FIG. 9 is an illustrative flow for programmatically verifying electronic domain names, according to at least one example.

FIG. 9 illustrates an example flow diagram for verifying electronic domain names described herein, according to at least one example. In some examples, the one or more domain management computers 810 (e.g., utilizing at least one of the text module 836, the character graph module 838, the actions module 840, the story complexity module 842, the vocabulary module 844, and/or the notification module 846) or one or more user devices 804 shown in FIG. 8 may perform the process 900 of FIG. 9.

Some or all of the process 900 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 900 may begin at 902 by receiving a plurality of network domain names. For example, the domain management computers 810 may receive a plurality of network domain names from a data store associated with a computer system in a distributed system of computers. The network domain names may comprise one or more user names and one or more top level domain names for each electronic domain name listed in the plurality of network domain names.

At 904, a receipt frequency may be determined. For example, the domain management computers 810 may aggregate the plurality of network domain names by the top level domain name in order to determine a receipt frequency of each top level domain name associated with the electronic domain name configured to be verified. The aggregated top level domain name may correspond with a number of times that an electronic domain name associated with each top level domain name has initiated a registration process or other interaction with one or more computer systems in the distributed system of computers.

In some examples, the determined receipt frequency may be compared with a receipt threshold. This may help identify how frequently each top level domain name is used to register with computer systems in the distributed system of computers. When the receipt frequency exceeds the receipt threshold, the top level domain name may be less likely to be fraudulent and more likely to be a valid electronic domain name for a user.

In some examples, when the receipt frequency exceeds the receipt threshold, the domain management computers 810 may receive and match additional information with the electronic domain name that originates from a confirmation source. For example, the matching of additional information may correspond with an identifier that is the same (e.g., same email address, etc.) between two different data sources (e.g., the domain management computers 810 and the confirmation source, etc.).

In some examples, any matched additional information from the confirmation source may be provided to the user. For example, the matched additional information may be used to populate a registration network document to help prevent the user from providing the additional information a second time. The registration network document, in some examples, may be completed prior to allowing access by the user to a verified network document and/or gateway associated with the domain management computers 810.

At 906, an indication of access to a registration network document may be received. For example, the domain management computers 810 may receive a first indication of access to the registration network document. The first indication of access may be associated with the electronic domain name associated with the user. In some examples, the registration network document may be populated with the additional information from the confirmation source as well.

At 908, a notification may be transmitted. For example, the domain management computers 810 may transmit a notification to an account associated with the username associated with the electronic domain name that has accessed the registration network document. The notification may comprise a link to confirm that the user has access to the account associated with the user name or a confirmation code that may be provided back to the domain management computers 810 to confirm that the user has access to the account associated with the user name.

In some examples, the domain management computers 810 may receive a confirmation of the notification in response to the transmission of the notification. For example, when the user selects the link from the notification, an electronic communication may be transmitted to the domain management computers 810. This may serve as a confirmation of the notification. In another example, the confirmation code may be provided to a user interface and received by the domain management computers 810 via the user interface. This may also serve as a confirmation of the notification.

At 910, access to a verified network document and/or gateway may be provided. For example, the domain management computers 810 may provide access after the electronic domain name has been verified through the multi-level verification process. The verified network document and/or gateway may provide access to restricted items or additional information that is not available without first completing the multi-level verification process.

Illustrative methods and systems for verifying electronic domain names are described above. Some or all of these systems and methods may, but need not, be implemented at least partially by architectures such as those shown at least in FIGS. 1-9 above.

Figure 10:
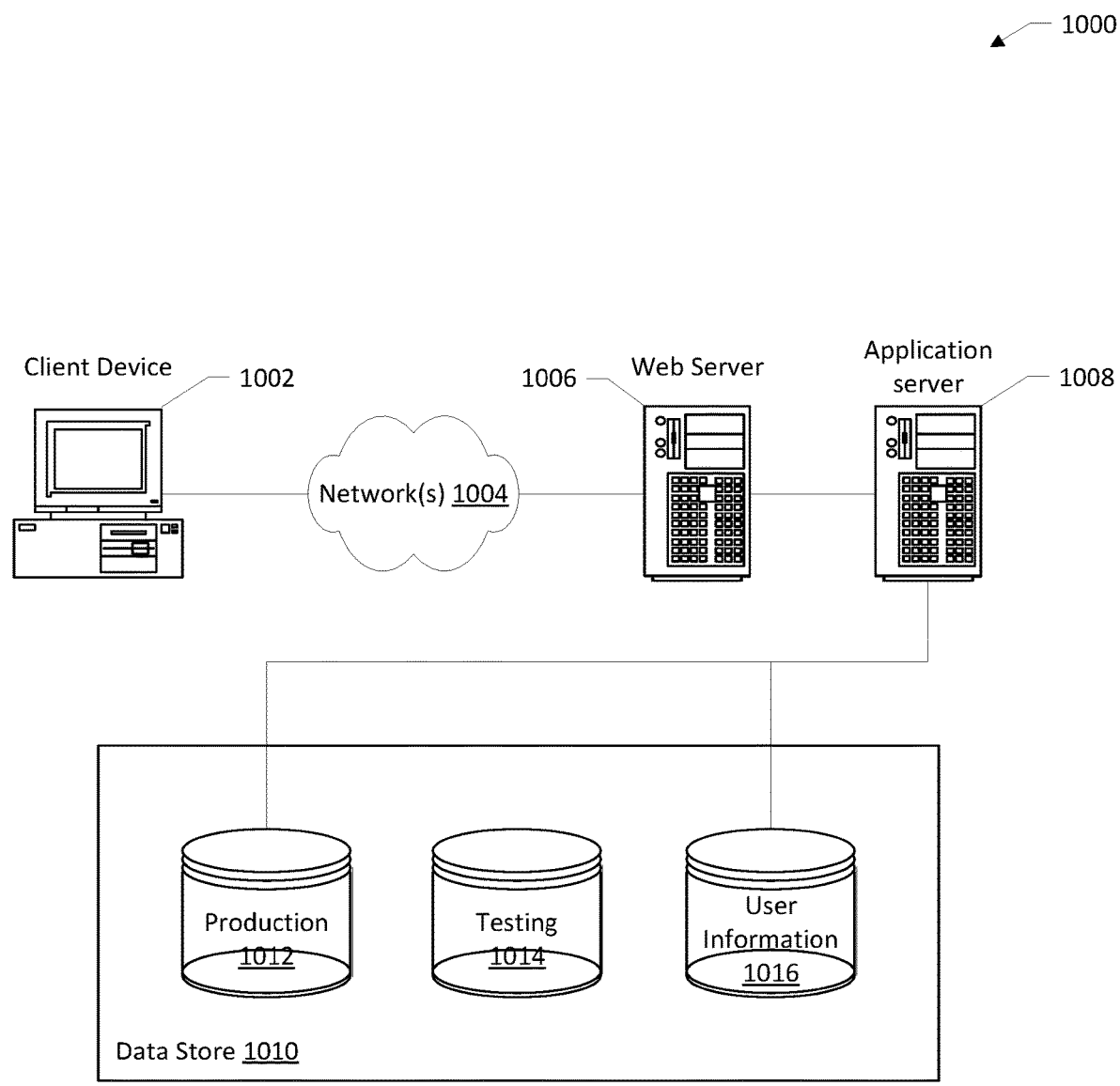
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computing system of a distributed system, a network domain name corresponding to a plurality of registration processes;
   determining, by the computing system, a receipt frequency for the network domain name, the receipt frequency corresponding to a number of times the network domain name has been received by any computing system of the distributed system as part of the plurality of registration processes;
   receiving a request comprising the network domain name;
   in response to a determination that the receipt frequency exceeds a receipt threshold, obtaining, by the computing system from a confirmation source, information associated with the network domain name, the information being obtained from the confirmation source based at least in part on comparing the network domain name received in the request to data maintained by the confirmation source;
   prepopulating a registration network document with the information obtained from the confirmation source;
   transmitting a notification to an account associated with the network domain name;
   receiving a confirmation of the notification in response to transmission of the notification; and
   providing access a verified network document to a user associated with the request.

2. The computer-implemented method of claim 1, further comprising:
   generating a profile that comprises the network domain name and the information.

3. The computer-implemented method of claim 1, wherein the notification comprises an access code and the confirmation comprises the access code.

4. The computer-implemented method of claim 1, further comprising:
   initiating a Bayesian classification process with the network domain name; and
   clustering the network domain name based at least in part on the Bayesian classification process.

5. One or more non-transitory computer-readable storage media collectively storing computer-executable instructions that, when executed by one or more computer systems, configure the one or more computer systems of a distributed system to collectively perform operations comprising:
   obtaining a plurality of network domain names;
   determining a receipt frequency of the each of the plurality of network domain names, the receipt frequency corresponding to a number of times a respective network domain name of the plurality of network domain names has been received by any computing system of the distributed system; and
   receiving a request comprising a network domain name of the plurality of network domain names;
   in response to determining the receipt frequency for the network domain name exceeds a receipt threshold, obtaining, from a confirmation source, information associated with the network domain name based at least in part on comparing the network domain name received in the request to data maintained by the confirmation source;
   receiving a first indication of access to a registration network document;
   prepopulating the registration network document with the information obtained from the confirmation source;
   transmitting a notification to an account associated with the network domain name;
   receiving a confirmation of the notification in response to transmission of the notification; and
   providing a verified network document.

6. The one or more non-transitory computer-readable storage media of claim 5, wherein the verified network document is filtered to comprise one or more items associated with the network domain name.

7. The one or more non-transitory computer-readable storage media of claim 5, wherein the notification transmitted to the account comprises a code to identify that a user associated with the request has access to the network domain name.

8. The one or more non-transitory computer-readable storage media of claim 5, the one or more computer systems further configured to perform operations comprising triggering a manual verification process of the network domain name.

9. The one or more non-transitory computer-readable storage media of claim 5, wherein the plurality of network domain names are obtained based at least in part on filtering duplicate network domain names of a larger plurality of network domain names that have been used to access the distributed system to generate the plurality of network domain names wherein each network domain name is unique from each other.

10. The one or more non-transitory computer-readable storage media of claim 5, the one or more computer systems further configured to perform operations comprising initiating a de-noising process to remove duplicate registration processes associated with the network domain name.

11. A computer system, comprising:
a memory configured to store computer-executable instructions; and
a processor in communication with the memory configured to execute the computer-executable instructions to at least:
receive a registration request comprising a network domain name;
determine a receipt frequency for the network domain name, the receipt frequency corresponding to a number of times the network domain name has been received by one or more computer systems of a distributed computer system;
in accordance with a determination that the receipt frequency exceeds a receipt threshold, obtain information originating from a confirmation source based at least in part on comparing the network domain name to data maintained by the confirmation source;
prepopulate a registration network document with the information;
transmit a notification to an account associated with the network domain name;
receive a confirmation of the notification in response to transmission of the notification; and
provide a verified network document associated with the network domain name.

12. The computer system of claim 11, wherein the processor is further configured to execute the computer-executable instructions to:
obtain a predetermined list of network domain names; and
identify and delete blocked network domain names from a predetermined list of network domain names.

13. The computer system of claim 12, wherein the processor is further configured to execute the computer-executable instructions to identify and delete free network domain names from the predetermined list of network domain names.

14. The computer system of claim 11, wherein the verified network document is accessible via a gateway.

15. The computer system of claim 11, wherein the processor is further configured to execute the computer-executable instructions to implement a classification process with the network domain name, the classification process classifying the network domain name as having commonalities with other enterprises that have previously been identified by the system.

16. The computer system of claim 15, wherein the classification process further comprises determining a probability, wherein the probability is associated with an identification of the network domain name as corresponding with a predetermined enterprise.

17. The computer system of claim 15, wherein the classification process further comprises self-clustering.

18. The computer system of claim 12, wherein the processor is further configured to execute the computer-executable instructions to generate a Venn diagram of overlapping network domain names, wherein the Venn diagram comprises first data from the confirmation source and second data associated with the network domain name.

19. The computer system of claim 11, wherein the network domain name is associated with a secure communication protocol.

* * * * *